(12) United States Patent
Markle et al.

(10) Patent No.: US 9,990,634 B2
(45) Date of Patent: *Jun. 5, 2018

(54) MANAGING AN EXPERIENCE OF A MEMBER ORGANIZATION OF A COLLABORATIVE COMMERCE COMMUNITY THROUGH A NETWORK

(75) Inventors: Steve Markle, Redwood City, CA (US); Gopal Sundaram, Cupertino, CA (US); Kshitij Dayal, San Jose, CA (US); Olaf Erik Gregor Schrader, Munich (DE); Abhishek Bhadoria, Sunnyvale, CA (US)

(73) Assignee: Ariba, Inc., Sunnyvale, CA (US)

( * ) Notice: Subject to any disclaimer, the term of this patent is extended or adjusted under 35 U.S.C. 154(b) by 1066 days.

This patent is subject to a terminal disclaimer.

(21) Appl. No.: 13/600,389

(22) Filed: Aug. 31, 2012

(65) Prior Publication Data

US 2012/0323720 A1 Dec. 20, 2012

Related U.S. Application Data

(63) Continuation-in-part of application No. 13/270,189, filed on Oct. 10, 2011, which is a continuation-in-part (Continued)

(51) Int. Cl.
*G06Q 30/00* (2012.01)
*G06Q 30/06* (2012.01)

(52) U.S. Cl.
CPC ......... *G06Q 30/00* (2013.01); *G06Q 30/0615* (2013.01)

(58) Field of Classification Search
CPC .................................................. G06Q 30/0615
(Continued)

(56) References Cited

U.S. PATENT DOCUMENTS 5,253,165 A 10/1993 Leiseca et al.
6,285,983 B1 9/2001 Jenkins
(Continued)

OTHER PUBLICATIONS

Levermore et al., "A New Design for Open and Scalable Collaboration of Independent Databases in Digitally Connected Enterprises," Journal of the Association for Information Systems, v11i7, Jul. 2010; ProQuest Dialog #734860950, 32pgs.*

*Primary Examiner* — Robert M Pond
(74) *Attorney, Agent, or Firm* — Brian R. Short

(57) ABSTRACT

Embodiments for methods, systems and apparatuses for managing a member organization experience of a collaborative commerce community through a network are disclosed. One method includes managing buyer company profiles of a plurality of buyer organizations and seller company profiles of a plurality of seller organizations, wherein the buyer company profiles and the seller company profiles are shared amongst the buyer organizations and the seller organizations associated with the network, wherein the member organization is at least one of the plurality of seller organizations or the plurality buyer organizations. The method further includes providing unified management of collaborative interactions between the plurality of seller organizations and the plurality of buyer organizations, determining an intra-organization link between users of the member organization based on the collaborative interactions of the member organization and a subset of the plurality of buyer organizations or a subset plurality of seller organizations.

29 Claims, 6 Drawing Sheets

Related U.S. Application Data of application No. 13/176,020, filed on Jul. 5, 2011, now Pat. No. 8,688,537.

(60) Provisional application No. 61/488,744, filed on May 22, 2011.

(58) Field of Classification Search
 USPC ................................................ 705/26, 27
 See application file for complete search history.

(56) References Cited

U.S. PATENT DOCUMENTS

| | | |
|---|---|---|
| 6,285,989 B1 | 9/2001 | Shoham |
| 6,584,451 B1 | 6/2003 | Shoham et al. |
| 6,606,603 B1 | 8/2003 | Joseph et al. |
| 6,952,682 B1 | 10/2005 | Wellman |
| 7,043,531 B1 | 5/2006 | Seibel et al. |
| 7,072,061 B2 | 7/2006 | Blair et al. |
| 7,117,165 B1 | 10/2006 | Adams et al. |
| 7,130,815 B1 | 10/2006 | Gupta |
| 7,146,331 B1 | 12/2006 | Young |
| 7,152,043 B2 | 12/2006 | Alaia et al. |
| 7,200,578 B2 | 4/2007 | Paltenghe et al. |
| 7,225,145 B2 | 5/2007 | Whitley et al. |
| 7,225,152 B2 | 5/2007 | Atkinson et al. |
| 7,249,085 B1 | 7/2007 | Kinney, Jr. et al. |
| 7,283,979 B2 | 10/2007 | Tulloch et al. |
| 7,283,980 B2 | 10/2007 | Alaia et al. |
| 7,296,001 B1 | 11/2007 | Ephrati et al. |
| 7,346,574 B2 | 3/2008 | Smith et al. |
| 7,383,206 B2 | 6/2008 | Rupp et al. |
| 7,395,238 B2 | 7/2008 | Alaia et al. |
| 7,401,035 B1 | 7/2008 | Young |
| 7,444,299 B2 | 10/2008 | Smith et al. |
| 7,483,852 B2 | 1/2009 | Marhafer et al. |
| 7,499,876 B2 | 3/2009 | Rupp et al. |
| 7,536,362 B2 | 5/2009 | Starr et al. |
| 7,558,746 B2 | 7/2009 | Alaia et al. |
| 7,558,752 B1 | 7/2009 | Ephrati et al. |
| 7,571,137 B2 | 8/2009 | Alaia et al. |
| 7,599,878 B2 | 10/2009 | Atkinson et al. |
| 7,634,439 B1 | 12/2009 | Smith |
| 7,657,461 B2 | 2/2010 | Young |
| 7,693,747 B2 | 4/2010 | Bryson et al. |
| 7,792,707 B2 | 9/2010 | Alaia et al. |
| 7,792,713 B1 | 9/2010 | Kinney, Jr. et al. |
| 7,813,966 B2 | 10/2010 | Alaia et al. |
| 7,835,957 B1 | 11/2010 | Kinney, Jr. |
| 7,840,476 B1 | 11/2010 | Zack et al. |
| 7,870,034 B2 | 1/2011 | Rupp et al. |
| 7,870,054 B2 | 1/2011 | Abeshouse et al. |
| 7,870,115 B2 | 1/2011 | Blair et al. |
| 7,921,053 B2 | 4/2011 | Kinney, Jr. et al. |
| 7,974,908 B1 | 7/2011 | Hommrich et al. |
| 8,086,518 B1 | 12/2011 | Maor |
| 8,095,451 B2 | 1/2012 | Smith et al. |
| 8,126,701 B2 | 2/2012 | Beck |
| 8,126,799 B2 | 2/2012 | Kellam et al. |
| 8,190,482 B1 | 5/2012 | Federighi et al. |
| 8,374,922 B1 | 2/2013 | Antony |
| 9,058,378 B2 * | 6/2015 | Schuil ................ G06F 17/3069 |
| 2001/0047276 A1 * | 11/2001 | Eisenhart ............ G06Q 10/10 705/37 |
| 2002/0069079 A1 | 6/2002 | Vega |
| 2002/0165844 A1 | 11/2002 | Lee et al. |
| 2005/0038688 A1 | 2/2005 | Collins et al. |
| 2005/0144046 A1 | 6/2005 | Schloss |
| 2006/0178918 A1 * | 8/2006 | Mikurak ............. G06Q 10/06 705/7.25 |
| 2007/0112671 A1 | 5/2007 | Rowan |
| 2007/0214060 A1 | 9/2007 | Whitley et al. |
| 2007/0239596 A1 | 10/2007 | Kinney, Jr. et al. |
| 2007/0299765 A1 | 12/2007 | Smith et al. |
| 2008/0027879 A1 | 1/2008 | Ephrati et al. |
| 2008/0065526 A1 | 3/2008 | Smith et al. |
| 2008/0071672 A1 | 3/2008 | Rupp et al. |
| 2008/0133377 A1 | 6/2008 | Alaia et al. |
| 2008/0133397 A1 | 6/2008 | Tulloch et al. |
| 2008/0133398 A1 | 6/2008 | Kinney et al. |
| 2008/0133399 A1 | 6/2008 | Rupp et al. |
| 2008/0147533 A1 | 6/2008 | Alaia et al. |
| 2008/0147534 A1 | 6/2008 | Ephrati et al. |
| 2008/0154763 A1 | 6/2008 | Alaia et al. |
| 2008/0162285 A1 | 7/2008 | Tulloch et al. |
| 2008/0162330 A1 | 7/2008 | Atkinson et al. |
| 2008/0162331 A1 | 7/2008 | Ephrati et al. |
| 2008/0162332 A1 | 7/2008 | Alaia et al. |
| 2008/0183509 A1 | 7/2008 | Schloss |
| 2008/0183614 A1 | 7/2008 | Gujral et al. |
| 2008/0201254 A1 | 8/2008 | Sharma et al. |
| 2008/0208616 A1 | 8/2008 | Young |
| 2008/0300959 A1 | 12/2008 | Sinha et al. |
| 2009/0099933 A1 | 4/2009 | Marhafer et al. |
| 2009/0259650 A1 * | 10/2009 | Schuil ................ G06F 17/3069 |
| 2009/0292647 A1 | 11/2009 | Porat et al. |
| 2010/0017273 A1 | 1/2010 | Hommrich et al. |
| 2010/0179860 A1 | 7/2010 | Noel et al. |
| 2010/0268656 A1 | 10/2010 | Teicher |
| 2011/0166951 A1 | 7/2011 | Abeshouse et al. |
| 2011/0173093 A1 * | 7/2011 | Psota .................. G06Q 30/06 705/26.35 |
| 2011/0219034 A1 | 9/2011 | Dekker et al. |
| 2012/0036043 A1 * | 2/2012 | Koch .............. G06Q 30/0613 705/26.41 |

* cited by examiner

MANAGING AN EXPERIENCE OF A MEMBER ORGANIZATION OF A COLLABORATIVE COMMERCE COMMUNITY THROUGH A NETWORK

RELATED APPLICATIONS

This patent application is a continuation-in-part (CIP) of U.S. patent application Ser. No. 13/270,189, filed Oct. 10, 2011, which is a continuation-in-part (CIP) of U.S. patent application Ser. No. 13/176,020, filed Jul. 5, 2011, which claims priority to U.S. Provisional Patent Application No. 61/488,744 filed on May 22, 2011, which are all herein incorporated by reference.

FIELD OF THE DESCRIBED EMBODIMENTS

The described embodiments relate generally to a supplier/buyer commerce network. More particularly, the described embodiments relate to a methods, apparatuses and systems for a managing an experience of a member organization of a collaborative commerce community of the supplier/buyer commerce network.

BACKGROUND

Commerce networks provide a means for electronically connecting buyers and suppliers. Buyers can enhance their supplier network by being electronically connected to many different suppliers. As a result, a buyer may be able to obtain better selection and pricing, and the suppliers may be able to realize additional sales.

Suppliers are able to provide information that describes the supplier online. Additionally, suppliers can port their offline (brick-and-mortar) reputations, references, and provide potential new customers with the ability to interact with those references.

Commerce networks, however, are limited in their ability to provide notices of potentially beneficial connections between users of either the buyers and/or suppliers. Such connections can be based, for example, on collaborative interactions, and/or based on general commerce information of the buyers and/or suppliers.

There is a need for systems, methods and apparatuses for a commerce network that managing a user's experience and providing introductions between users of the commerce network.

SUMMARY

An embodiment includes a computer-method of managing a member organization experience of a collaborative commerce community through a network. The method includes managing, by one or more servers, buyer company profiles of a plurality of buyer organizations and seller company profiles of a plurality of seller organizations, wherein the buyer company profiles and the seller company profiles are shared amongst the buyer organizations and the seller organizations associated with the network, and wherein the member organization is at least one of the plurality of seller organizations or the plurality buyer organizations. The method further includes providing unified management of collaborative interactions between the plurality of seller organizations and the plurality of buyer organizations, determining an intra-organization link between users of the member organization based on the collaborative interactions of the member organization and a subset of the plurality of buyer organizations or a subset of the plurality of seller organizations, and electronically notifying at least one user of the member organization of the determined intra-organization link.

An alternate embodiment includes determining intra-organization links between users of the member organization based on the buyer company profiles and/or the seller company profiles.

Another embodiment includes a commerce community system for managing a member organization experience of a commerce community through a network. The system includes a commerce server (one or more servers) electronically connected to servers of a plurality of seller organizations and servers of a plurality of buyer organizations through the network, wherein the member organization is at least one of the plurality of seller organization or the plurality of buyer organizations. For this embodiment, the commerce server is operative to manage buyer company profiles of the plurality of buyer organizations and seller company profiles of the plurality of seller organizations, wherein the buyer company profiles and the seller company profiles are shared amongst all buyer organizations and seller organizations associated with the network. Further, the commerce server is operative to provide unified management of collaborative interactions between the plurality of seller organizations and the plurality of buyer organizations, determine an intra-organization link between users of the member organization based on the collaborative interactions of the member organization and at least a subset of the plurality of buyer organizations or at least a subset of the plurality of seller organizations, and notify the users of the member organization of the determination of the intra-organization link.

Another embodiment includes a program storage device readable by a machine, tangibly embodying a program of instructions executable by the machine to perform a computer-method of managing a member organization experience of a collaborative commerce community through a network. The computer-method includes managing, by one or more servers, buyer company profiles of a plurality of buyer organizations and seller company profiles of a plurality of seller organizations, wherein the buyer company profiles and the seller company profiles are shared amongst the buyer organizations and the seller organizations associated with the network, wherein the member organization is at least one of the plurality of seller organizations or the plurality buyer organizations. The method further includes providing unified management of collaborative interactions between the plurality of seller organizations and the plurality of buyer organizations, determining an intra-organization link between users of the member organization based on the collaborative interactions of the member organization and a subset of the plurality of buyer organizations or a subset of the plurality of seller organizations, and electronically notifying at least one user of the member organization of the determined intra-organization link.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, systems and apparatuses for managing a member organization experience of a collaborative commerce community through a network. The collaborative community provides electronic inter-connections having the capability to connect many sellers with many buyers, and many buyers to many sellers. Further, electronic inter-connections of the collaborative community have the capability to manage collaborative interactions between the many sellers and many buyers. For embodiments, the collaborative interactions are related to the business processes of buy, selling, and managing cash flow in business to business (B to B) commerce. The electronic management provided by the described embodiments simplifies the collaborative process for the sellers and the buyers. Further, based on entered or collected information of each of the many sellers and many buyers, alerts or notifications can be provided to the sellers and/or buyers, thereby providing additional benefits to the sellers and buyers. In addition to notifications, at least some embodiments include meta-information that is collected about the buyer and seller participants to better facilitate more connections and hence more interactions, thereby creating a virtuous circle of more community and collaboration in a network effect.

Figure 1:
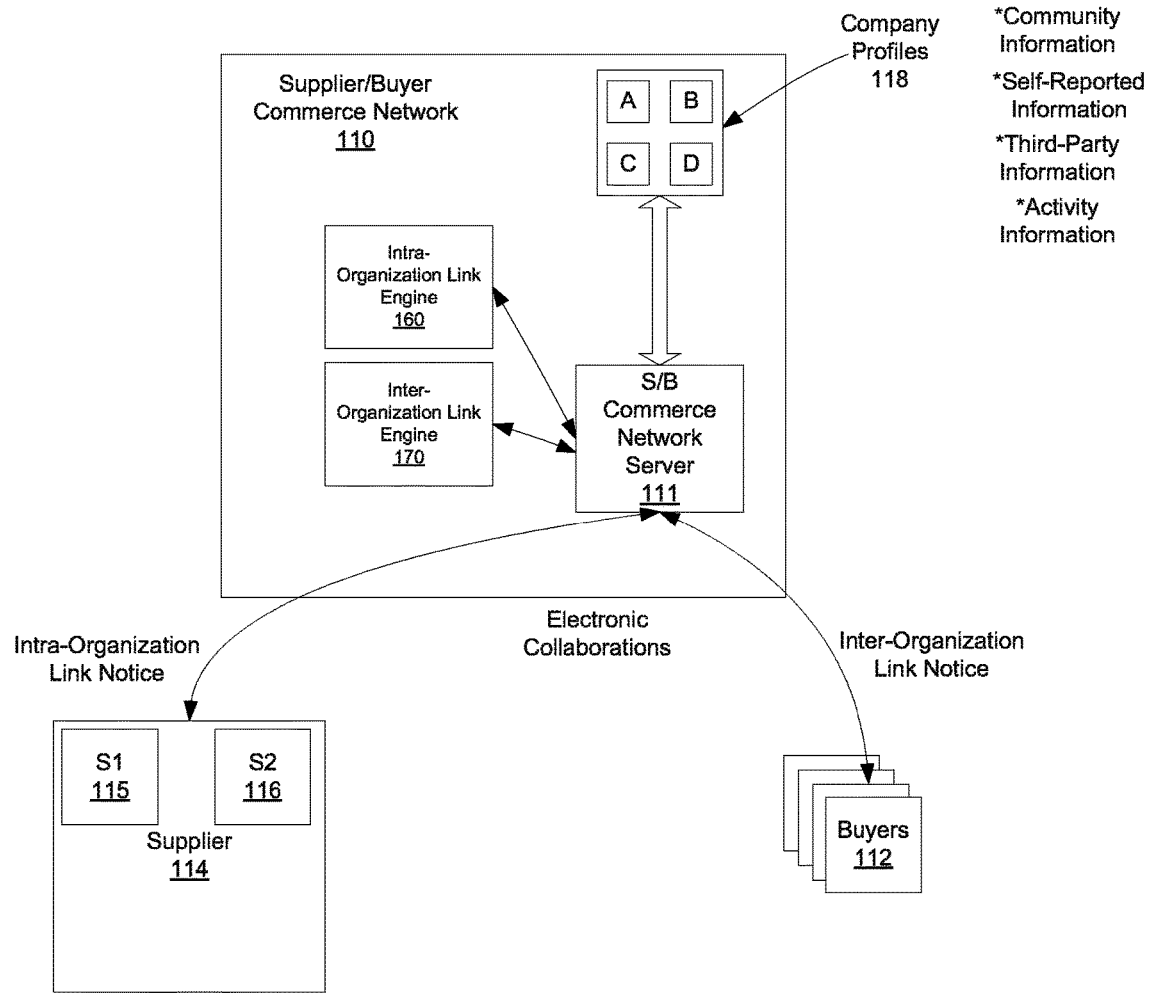
FIG. 1 shows a system that facilitates management of a member organization experience of a collaborative commerce community through a network, according to an embodiment.

FIG. 1 shows a system that facilitates management of a member organization experience of a collaborative commerce community through a supplier/buyer commerce network 110, according to an embodiment. The member organization can be a seller (such as supplier 114), a buyer (such as buyers 112), or both a seller and a buyer. Each of the member organizations includes one or more users. For example, as shown, the supplier (seller) 114 includes a first user 115 and a second user 116. While only a single supplier (seller) 114 that include multiple users is shown in FIG. 1, it is to be understood that any number of sellers can be electronically connected to the supplier/buyer commerce network 110. While multiple buyers 112 are shown, it is to be understood that any number of buyers can be connected to the supplier/buyer commerce network 110 (the supplier/buyer network can alternatively be referred to as a business network), wherein each of the buyers can include any number of users. It is also to be understood that while some of the described embodiments may be directed to interactions between users of the seller (supplier) 114, similar types of interactions can be implemented between users of the buyers 112 as well.

Embodiments of the buyers 112 and the supplier 114 include one or more enterprise networks that include one or more enterprise servers. That is, while not shown in FIG. 1, the buyers 112 and the suppliers 114 may each include one or more enterprise networks (which include one or more enterprise servers). The enterprise servers of the buyers 112 and the supplier 114 are network connected (through, example, the internet) to the supplier/buyer commerce network 110.

Embodiments of the supplier/buyer commerce network 110 include one or more servers (such as, S/B commerce network server 111) that support the described embodiments for management of a member organization experience of the collaborative commerce community. Embodiments of each of the servers include processors.

Exemplary processing engines that are a part of the supplier/buyer commerce network 110, and may be operable on the S/B commerce network server 111, include an intra-organization link engine 160 and an inter-organization link engine 170. The intra-organization link engine 160 identifies characteristics of users (such as, users 115, 116) of the seller (or in other embodiments, the buyer) that suggest that one or more of the users could benefit by receiving an alert of the existence of one or more other users of the seller. For example, two different users of the seller may be utilizing the supplier/buyer commerce network 110, wherein the two different users are a part of different organizations of the seller, but are physically close to each other. Due to the physical proximity of the two different users, each of the two different users may be benefited by being made aware of the existence of the other.

It is important for users (colleagues) of an organization to know if and when other colleagues (for example, other users of a buyer or seller) are part of a particular community. This knowledge can be used to lower barriers to collaboration and hence better business performance (through lower costs of getting people (users) to connect and communicate).

An embodiment includes a Recommended Account sub-feature as a part of an account hierarchy feature of the supplier/buyer commerce network 110. For example, for intra-company user, the Recommended Account sub-feature can use business information entered by a user to identify an existing account of a company of the user on the supplier/buyer commerce network 110. For an embodiment, seller profiles are matched base on, for example, an email domain, a tax ID, a DUNS, or a VAT ID. For an embodiment, the matching is on a company level and not user level, but it will bring user together once the accounts are linked.

The inter-organization links engine 170 identifies characteristics of the buyers and sellers that suggest that one or more of the buyers or sellers could benefit by receiving an alert of the existence of one or more of the other buyers or sellers. For example, a seller could benefit from an alert that indicates a buyer who probably would like to purchase what the seller is selling, and a buyer could benefit from an alert that indicates a seller who sells what the buyer is seeking to buy.

As will be described, embodiments of the intra-organization link engine 160 and the inter-organization links engine 170 utilize profile information of the suppliers and/or buyers, and/or collaboration information of the suppliers and/or buyers.

For at least some embodiments, a company profile 118 includes at least four quadrants that include at least a first quadrant (A) that includes self-reported information, a second quadrant (B) that includes community information, a third quadrant (C) that includes third party information, and a fourth quadrant (D) that includes aggregated activity information. It is to be understood that this is an exemplary list, and that other information of the suppliers and/or buyers can be used to supplement the company profiles.

For at least some embodiments, the collaboration information is based on collaborative interactions between the suppliers and the buyers. For at least some embodiments, the collaborative interactions between the plurality of sellers and the plurality of buyers includes selling, bid, quoting, contract management, product or service fulfill, invoicing, and/or collections is to be understood that this is an exemplary list, and that other collaborative interactions can be utilized as well.

Embodiments of the supplier/buyer commerce network 110 provide a useful, friendly interface for the member (suppliers and/or buyers) organizations. The many supplier to many buyer interface provided by the supplier/buyer commerce network 110 provides for better, more efficient interaction and exchange between the suppliers 114 and the buyers 112.

Figure 2:
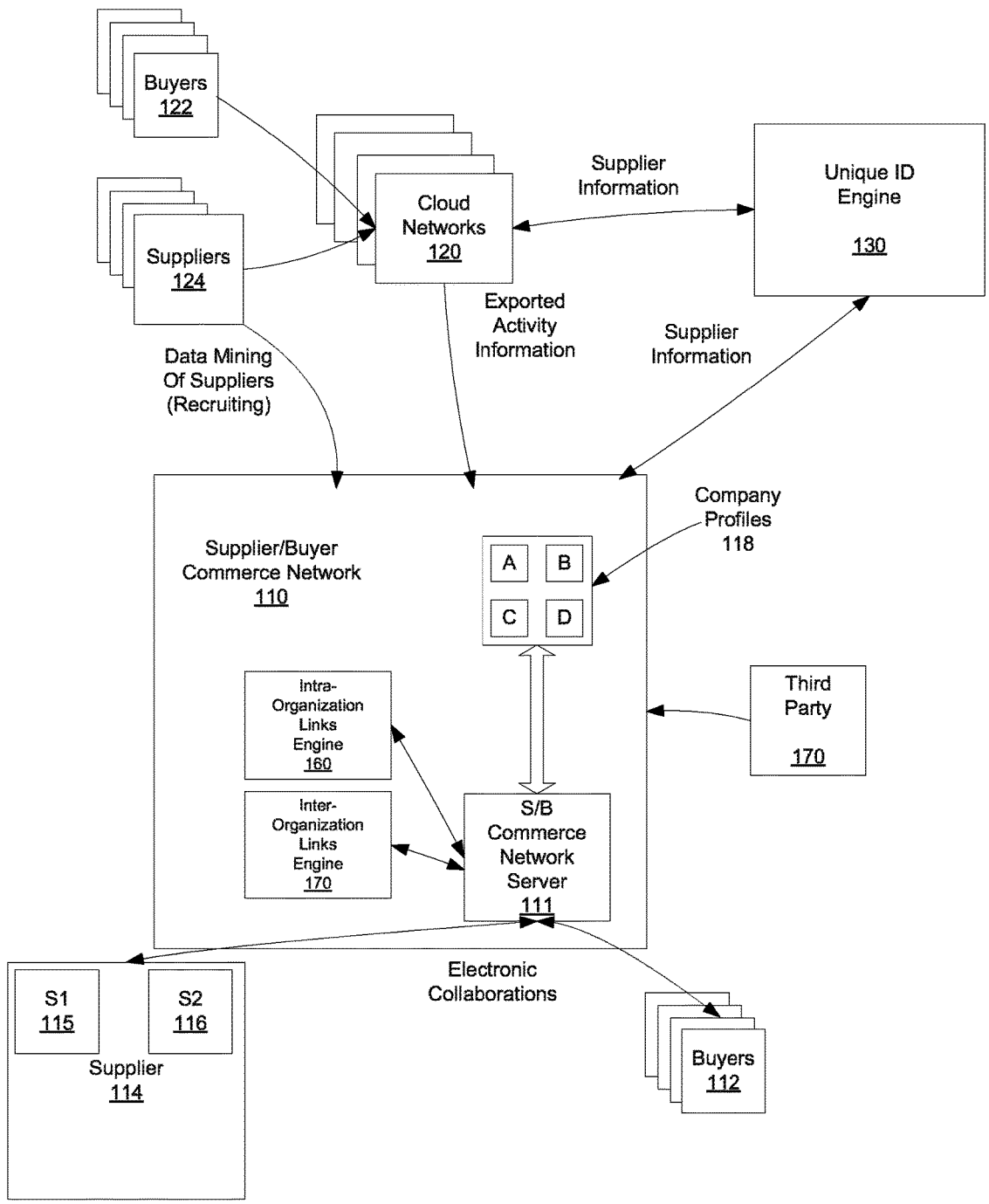
FIG. 2 shows a system that facilitates management of a member organization experience of a collaborative commerce community through a network, according to a more detailed embodiment.

FIG. 2 shows a system that facilitates management of a member organization experience of a collaborative commerce community through a network, according to a more detailed embodiment. For this embodiment, the supplier/buyer commerce network 110 obtains or gleans information outside of the supplier/buyer commerce network 110 to be used, for example, to supplement the company profiles For at least some embodiments, the buyers 112 are associated with the supplier/buyer commerce network 110 in some capacity. However, suppliers are not so limited. That is, the suppliers 112, 124 can be either associated (enabled) or not associated (not enabled) with the supplier/buyer commerce network 110. For example, as shown in FIG. 2, a first type of supplier 114 is associated with the supplier/buyer commerce network 110, while a second type of supplier 124 is not directly associated with the supplier/buyer commerce network 110, but is reached through cloud networks 120 (through, for example, the internet). After reached, the second type of supplier 124 can become associated with the supplier/buyer commerce network 110 (for example, via a directory service that manages the unique IDs for all connected Networks).

An embodiment further includes mining data of suppliers includes finding suppliers from other databases and/or reaching out, for example, through the internet to company (potential supplier) websites. That is, suppliers can be recruited that are a potential match with the buyer. The recruitment can be through the searching of databases (inside and outside of the supplier/buyer commerce network 110) and/or searching other company Once the buyer has been matched to a set of suppliers (alternatively or additionally suppliers matched to buyers), embodiments includes electronic communication alerting the suppliers of a current interest by the buyer to acquire good and/or service that the suppliers 114, 124 provide. The electronic communication can be made, for example, by emailing the anonymously harvested information to the selected set of suppliers. Additionally, or alternatively, the electronic communication can be made to the suppliers by, faxing, phoning, tweeting, a small message system (sms), an RDF site summary (RSS) feeds, an application programming interface (API) based integration, and/or third party integrations. For at least some embodiments, the matching includes, for example, matching a buyer's interest to acquire good and/or services with suppliers offering potential, or matching vendor master data from the buyer with cloud supplier accounts.

Embodiments include the company profile 118 being adaptively updated (by, for example, the commerce network server 111) as the company associated with the company profile 118 interacts with buyers 112, 122 and/or suppliers 114, 124. The company profile 118 can advantageously be used to generate a score for the company and/or match the company with other companies associated with the supplier/buyer commerce network 110. The company profile 118 is generally stored within a database associated with the supplier/buyer commerce network 110.

While the embodiments described are directed to a single company profile 118, it is to be understood that at least some of the described embodiments include multiple company profiles. For embodiments, each company profile corresponds with a different company associated with the supplier/buyer commerce network 110. The different company profiles provide a means for contrasting (for example, scoring) the different companies. Additionally, the different company profiles can be used to proactively match companies (suppliers 114 and buyers 112) associated with the supplier/buyer commerce network 110 (as described above).

As shown, and previously described, an embodiment of the company profile 118 includes four quadrants, wherein a first quadrant (A) includes self-reported information, a second quadrant (B) includes community information, a third quadrant (C) includes third party information, and fourth quadrant (D) includes aggregated activity information. It is to be understood that for some embodiments the company profile can include a subset of these quadrants, and for other embodiments, the company profile can include information in addition to the information of these four quadrants. The company profile 118 is a collection of information pertaining to the corresponding company that is associated with the network. The company profile allows other companies (suppliers 114 and/or buyers 112) to evaluate the company associated with the company profile 118. Clearly, the company profile can include fewer or more than the four quadrants.

The self-reported information (quadrant A) can be from (suppliers 114 and/or buyers 112) includes company provided information that can be received by the supplier/buyer commerce network and incorporated into the company profile. The self-reported information can be received in different ways. For example, a company may effectively "walk up" and join the supplier/buyer commerce network, or the company information can be loaded by the supplier/buyer commerce network 110 or from another database or application. For an embodiment, the public information becomes a part of the profile.

For embodiments, pieces of the self-reported information are used to drive additional processes in the supplier/buyer commerce network. That is, for example the self-reported information can include a DUNS number field. Once the supplier/buyer commerce network has the DUNS number, the supplier/buyer commerce network can provide financial risk score information on the supplier. The DUNS number can be used to drive communication with, for example, a third party. Additionally, as will be described, a matching process engine can analyze commodities (goods & services) a supplier has selected as providing, and the sales territories of the supplier, in order to match that supplier's profile against the business opportunities.

The community information (quadrant B) includes information that pertains to the company that is provided by suppliers 114 and buyers 112 associated with the network. The community information includes, for example, ratings. The ratings allow, for example, a buyer to rate any supplier that has responded to a business opportunity on the supplier/buyer commerce network 110.

Another aspect of the community information includes references. For at least some embodiments, a reference is a quote/citation from a buyer/customer which represents or verifies the quality performance of the good or service being supplied by the supplier/seller. For at least some embodiments, references include contact information for the buyer/customer such that other buyers who are interested in the supplier for whom the reference was given. The contact information is offered for other buyers to reach out to the buyer giving a reference for additional communications/elaboration about the seller/suppliers performance. To further facilitate community and parallel real world interactions, embodiments of the supplier/buyer commerce network allows other buyers to request contact with the author of any given reference. For embodiments, the subject of the reference (the supplier) is the gatekeeper in such an interaction and may decline or accept the third party's request to speak with a reference. For embodiments, the reference itself contains a few pieces of information, for example, a text narrative, industry of the buyer, and/or length of the business relationship.

The third party information (quadrant C) includes information that pertains to the company that is provided by a third party 170 who is typically not associated directly with the network. The third party information includes, for example, a business and credit rating provided by, for example, an established rating agency (such as, Dun & Bradstreet® (D&B)). The third party information can include financial risk information about suppliers. This can be linked or associated with the suppliers using self-reported DUNS number information. The DUNS information can be validated with D&B using an API call. The validated information can be displayed back to the supplier for their approval. Once approved, the supplier/buyer commerce network basically has the supplier linked to a risk profile on D&B.

The aggregated activity information includes, for example, transactional activity of the company. For example, the aggregated activity information can include information about suppliers and their performance on the supplier/buyer commerce network 110.

For an embodiment, maintaining a company profile of a company associated with a supplier/buyer commerce network includes collecting activity information of the company. For an embodiment, collecting of activity information includes monitoring a plurality of databases that each maintain activity information associated with the company, assigning a unique identification for the company across the plurality of databases, exporting the activity information associated with the company from each of the plurality of databases, aggregating the activity information, and updating the company profile with the aggregated activity information of the company. Embodiments include the supplier/buyer commerce network sharing the company profile with users of the supplier/buyer commerce network. Additionally, the aggregated activity information can include information about the buyer which can be presented anonymously. An embodiment includes an information harvesting engine managing the information collection, which can include information from the company profile of the buyer. For an embodiment, an anonymizing engine anonymizes the aggregated activity information. For embodiments, this includes removing information that allows tracing of the information back to the buyer or supplier. This can include, for example, redacting information within the aggregated activity information that could be used to identify the buyer. For an embodiment, the aggregated activity information is anonymized as selected by the buyer.

A useful piece of aggregated activity information included within the company profile is the number of transacting relationships that the company has with buyers/suppliers 112, 114 on the supplier/buyer commerce network 110, and/or transacting relationships the company has with buyers/suppliers 122, 124 of other commerce networks, such as cloud networks 120. This information provides a valuable picture of how many other companies the company is actively doing business with via the supplier/buyer commerce network 110, and the cloud networks 120. It is to be understood that doing business with other companies includes activities can include interactions that do not include money, good or services changing hands. If the supplier/buyer commerce network 110 is interfaced with cloud networks 120, the company profile can be made to be common (the same) between commerce network platforms. Therefore, real-time information can be utilized across the commerce and cloud network platforms 110, 120.

Examples of aggregated activity information include, but are not limited to, event invitations, invitations by revenue, transaction awards (for example, winning supplier bids), revenue ranges, and/or top bids by industry.

The interface between the supplier/buyer commerce network 110 and cloud networks 120 allows the supplier/buyer commerce network 110 to glean additional information that can be useful for enhancing the value of the company profile 118. For example, cloud network 120 can include sourcing and/or contract information and data. These embodiments determine commonality of suppliers/buyers across multiple private cloud networks. The different companies (buyer/sellers) are assigned unique identifiers by, for example, a unique ID engine 130, which allows the generation of a single view of the companies' behavior across multiple interactions (across the supplier/buyer commerce network 110 and the cloud networks 120. That is, for embodiments, one or more databases are associated with networks 110, 120 that maintain transactional activity of the company with other companies, and this transaction information for the company is identified by the unique identifier of the company.

Figure 3:
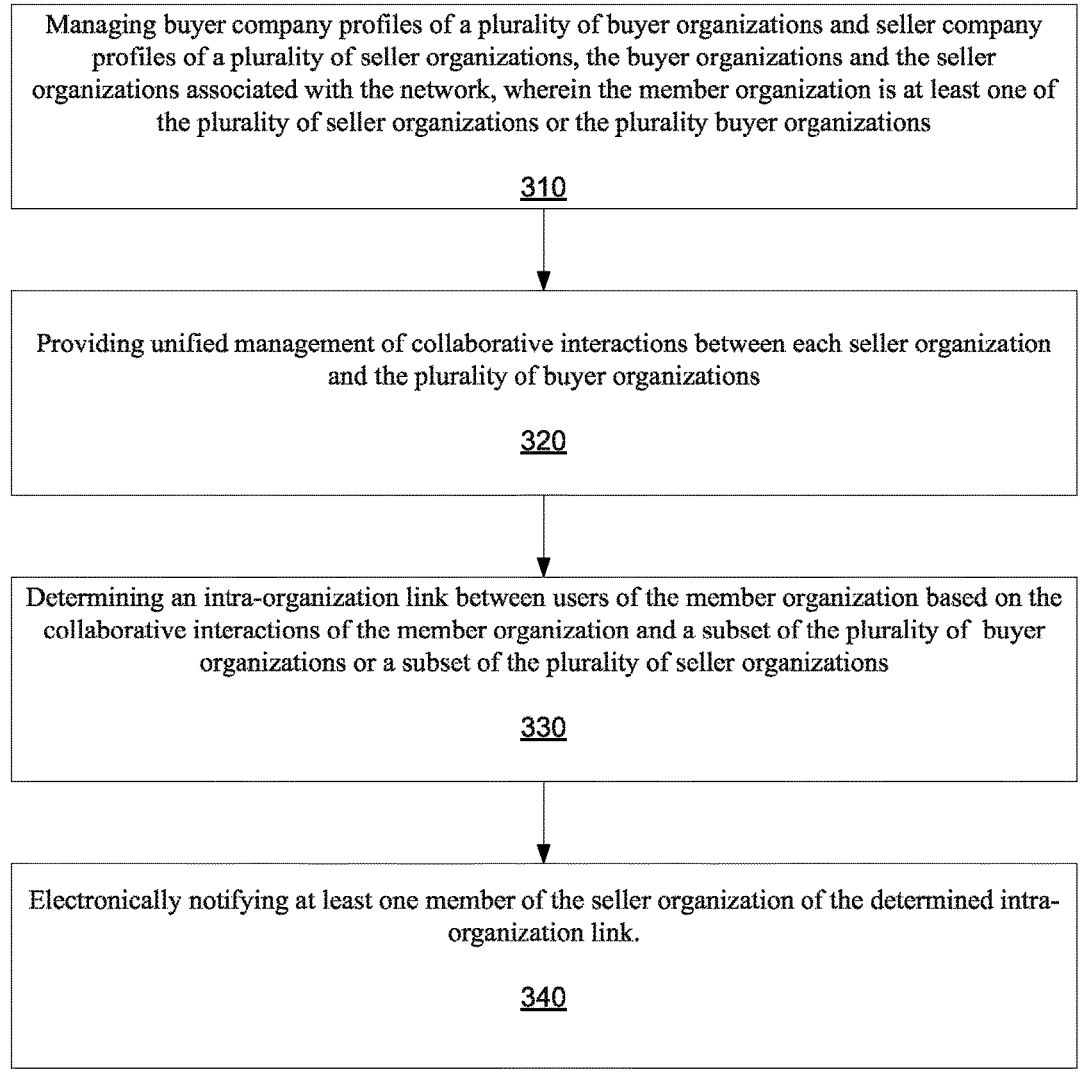
FIG. 3 is a flow chart that includes steps of a managing a member organization experience of a collaborative commerce community through a network.

FIG. 3 is a flow chart that includes steps of a managing a member organization experience of a collaborative commerce community through a network. A first step 310 includes managing buyer company profiles of a plurality of buyer organizations and seller company profiles of a plurality of seller organizations, the buyer organizations and the seller organizations associated with the network, wherein the member organization is at least one of the plurality of seller organizations or the plurality buyer organizations. For an embodiment, a key element is allowing the member organization to self-manage its company profile. For an embodiment, parts of the profiles are maintained as private, and are not shared or shared only with selected, for example, active trading relationships. A second step 320 includes providing unified management of collaborative interactions between the plurality of seller organizations and the plurality of buyer organizations. A third step 330 includes determining an intra-organization link between users of the member organization based on the collaborative interactions of the member organization and a subset of the plurality of buyer organizations or a subset of the plurality of seller organizations. A fourth step 340 includes electronically notifying at least one user of the member organization of the determined intra-organization link.

An embodiment includes determining an inter-organization link between the member organization and at least one of the plurality of buyer organizations or at least one of the plurality of seller organizations based on the collaborative interactions between the plurality of buyer organizations and the plurality of seller organizations. After establishing or determining the inter-organization link, an embodiment includes notifying the member organization of the inter-organization link between the member organization and the at least one of the plurality of buyer organizations or at least one of the plurality of seller organizations.

For at least some embodiments, managing a member organization experience includes providing at least one user of each member organization with a single login, and access to collaboration with the plurality of buyer organization and the plurality of seller organizations based on the single login. This single login and access is extremely valuable because of the seamless user experience it offers. That is, a single-login, single-click is all that is required to navigate a wealth of information about collaborative activity of the user and its organization. This eliminates inefficiencies associated with managing and maintaining multiple URLs and login accounts for each individual buyer and/or seller relationship.

The advent of cloud/network technology has obsoleted the process of 1 to 1 interactions that exist by a buyer and seller. The 1 to 1 interactions have a hidden cost because the real world works in many to many interactions and thus seller participants are burdened with maintaining individual logins, passwords, and url/website locations for each buyer they do business with. The described embodiments provide a cloud network technology that better matches how the real business world works. A seller participant can go to one location to manage the collaborative commerce interactions with all buyers they do business with just a single login password and URL.

As previously described, the profiles, such as the buyer company profiles of each buyer organizations include at least self-reported information of the buyer organization. For a specific embodiment, the self-reported information includes registration information, wherein the self-reported information of the buyer organization is utilized by the collaborative interaction between the buyer organization and the plurality of seller organizations. Additionally, as described, at least some embodiments, of the buyer company profile of each buyer organization further can include community information, third party information, and aggregated activity information. For at least some embodiments, the buyer company profile of each buyer organization is adaptively updated. The described embodiments also offers a location for company self-reported information to be automatically validated precluding the need/cost of human validation or the risk of using information that may not be accurate.

As previously described, each seller company profile includes self-reported information, community information, third party information, and aggregated activity information. For at least some embodiments, the supplier company profile of each supplier organization is adaptively updated.

For at least some embodiments, the collaborative interactions between the plurality of sellers and the plurality of buyers includes one or more of selling, bid, quoting, contract management, product or service fulfill, invoicing, and collections. The benefits provided by the many suppliers to many buyer interconnection provided by the collaborative commerce community network includes efficiency of the collaborative processes, and ease of scaling buyers and suppliers. Once in place, the cost of adding new or additional buyers and suppliers is minimal—both in cost and effort. The cost of adding new buyers and suppliers approaches zero as the number of buyers and sellers increases. Trading partner activity counts are typically higher because a single account is used across different trading partners, which additionally provides marketing advantages. Furthermore, details of the profiles of the member can be maintained with higher accuracy.

As suggested, a value of the collaborative commerce community network is identifiable in its ability to easily add buyers and suppliers and the information that collaborative commerce creates and for the benefit of the community beyond the specific buyer or seller interaction. The value of the many-to-many networks as have been described, is supported by Metcalfe's law, Sarnoff's law and Zuckerberg's law. Metcalfe's law states that the value of a telecommunications network is proportional to the square of the number of connected users of the system ($n^2$). Sarnoff's law states that the value of a broadcast network is directly proportional to the number of viewers. For example, a network with 100 members is 10 times as valuable as a network with 10 members. Zuckerberg's Law states that a network members' willingness to share their information doubles every year.

For at least some embodiments the determining the intra-organization link between users of the member organization includes correlating attributes of each of the users of the member organization with attributes of other users of the member organization. For at least some embodiments, the attributes includes at least one of email domain, tax id, vat id, company name, geography, member organization groups, identified common interests, similarities in member profile information, usage of similar key words, mobile location, or business processes, wherein the business processes include at least one of buying and selling. For at least some embodiments, the attributes of each of the user of the member organization are included within a company profile and/or a user profile of the member organization. A user profile is profile information that is specific to the user member of an organization that may be inherited from the organization or different that the organization.

At least some embodiments include identifying potential links to buyer organizations or seller organizations based on the determined intra-organization link between users of the member organization. That is, the previously described intra-organization links can be utilized to identify potential inter-organization links. For example, potential links to buyer organizations can be based on determined intra-organization link between the seller organization or a members of the seller organization.

At least some embodiments include notifying one or more of the users of the member organization of the identified potential links to the buyer organizations or the seller organizations. At least some embodiments include notifying the buyer organizations or seller organizations of the identified potential links to one or more of the users of the member organization.

While the identification of infra-organization and inter-organization links have been described as utilizing collaborative interactions, the intra-organization and inter-organization links can additionally, or alternatively be identified utilizing the company profile of the member organization and the buyer company profiles of the plurality of buyer organizations, or the seller company profiles of the plurality of seller organizations.

For at least some embodiments, determining the inter-organization link between the member organization and the at least one of the plurality of buyer organizations or the plurality of seller organizations is based at least in part on a company profile of the member organization and the buyer company profiles of the plurality of buyer organizations, or the seller company profiles of the plurality of seller organizations.

For at least some embodiments, determining the inter-organization link between the member organization and the at least one of the plurality of buyer organizations or plurality of buyer organizations is based at least in part on correlating attributes of the member company profile of the member organization with attributes of the buyer company profiles of the plurality of buyer organizations and the seller company profiles of the plurality of seller organizations. Examples of attributes of the company profiles that can be matched include, for example, common commodities, common interests, common languages, common regions, common addresses, common titles, common connections, common history, or common searches.

An embodiment includes electronically notifying the member organization of the inter-organization links. That is, once the inter-organization links have been identified, the member organizations of the links are electronically notified.

For an embodiment, managing a member organization experience includes providing at least one user of each member organization with a single user interface (UI), wherein the UI provides the at least one user with a single interface access to collaborative interactions, the buyer company profiles, the seller company profiles, sharing information about workflows, and documents associated with the collaborative interactions.

The single user interface is very valuable because if the interface is intuitive enough, then no training is required. That is, for embodiments, it is intuitive enough such that untrained new users can walk up the first time and figure out how to use it. Additionally, there is no switching of the user interface between customers/buyers for whom suppliers are doing or soliciting business. At least some embodiments include a single interface across business to business commerce processes (for example, Leads, Sourcing Proposals, Contracts, Purchasing, Orders & Invoices). Therefore, there is a higher level of consistency, which again, makes the system easy to use. Embodiments of the single interface are state of the art, and consistent with technology common in web based consumer applications. The single interface includes self-guided configurations. The single interface is easily user-configurable and user-personalized, thereby providing maximum efficiency and intuitive use, less maintenance, and not requiring support or consulting.

An embodiment includes providing at least one user of a seller (supplier) of the member organization with a web browser, allowing the at least one user to navigate to specific buyer interactions and collaborative interactions. For an embodiment, the web browser includes mobile interface. For various embodiments, the specific buyer interactions can include, for example, responding to a discovery posting, creating an order confirmation, creating an invoice, providing a bid for collaboration requests, uploading a time and expense sheet, accepting an early payment, entering an invoice against contract, publishing and an RFQ, an RFP, or an auction, creating a contract, or requesting a survey response.

For at least some embodiments, the UI allows the at least one user to manage a company profile of the member organization of the at least one user, set usage preferences, administer preferences and permissions, navigate business processes.

For at least some embodiments, the unified experience for both buyer and sellers/suppliers also offers an open interface for $3^{rd}$ party providers to integrate and augment the business processes and company profiles.

For at least some embodiments, navigating business processes includes providing tabs, wherein each UI segment (for example, aTab, section, dashboard screen) provides a window into collaborative interactions per buyer organization, seller organization, and each business process specific to that buyer/seller organization.

Figure 4:
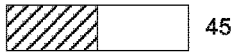
FIG. 4 is a screen-shot of a user interface (UI) of a company profile editor, according to an embodiment.

FIG. 4 is a screen-shot of a user interface of a company profile editor, according to an embodiment. As shown, the company profile editor provides an easy means for a member organization to update their profile. The platform exists on networking technology, and therefore, can take advantage of other networks very efficiently to make profile management easier/less costly. For example, by integrating the network of the platform with existing social networking websites for people in professional occupations to access company information versus having to type it in a screen, or, for example, integrating the network of the platform with D&B.

Figure 5:
FIG. 5 is a screen-shot of a user interface (UI) buyer relationship tab, according to an embodiment.

FIG. 5 is a screen-shot of a user interface of a buyer relationship tab, according to an embodiment. As shown, the buyer relationship tab provides an easy means for a buyer to access their relationships. Unlike any other existing technology, the described embodiments provide a place on the internet for a seller to go and see both all of their buyer relationships but also act on them/collaborate in the same interface. That is, for example, a dashboard character on the screen can provide all the information in one place.

Figure 6:
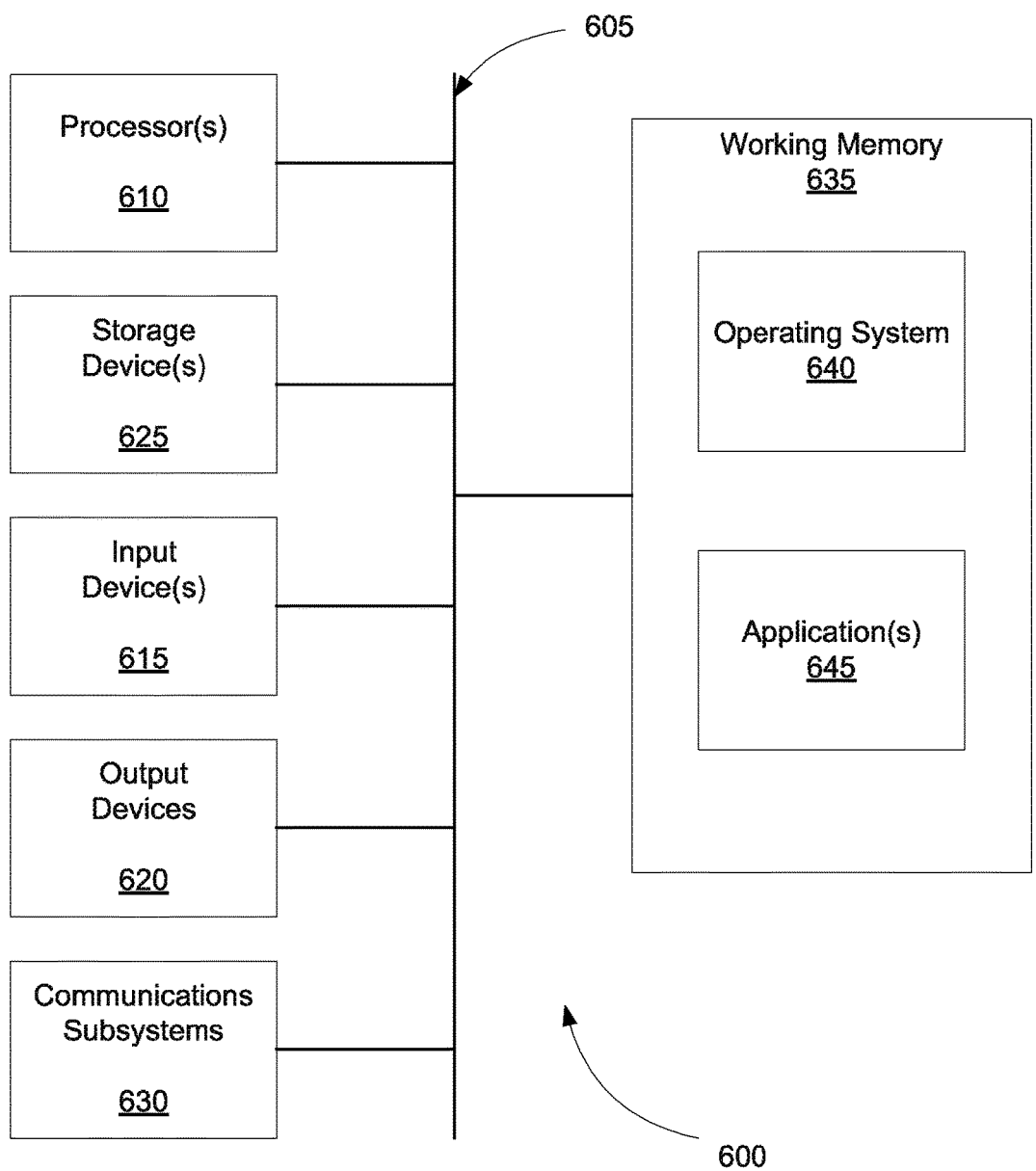
FIG. 6 shows a schematic illustration of one embodiment of a computer system that can perform the methods of the described embodiment, and/or can function as, for example, a supplier/buyer commerce network that electronically manages a member organization experience of a collaborative commerce community through a network.

FIG. 6 shows a schematic illustration of one embodiment of a computer system that can perform the methods of the described embodiment, and/or can function as, for example, a supplier/buyer commerce network that electronically manages a member organization experience of a collaborative commerce community through a network. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements can include one or more processors 610, communication subsystems 630, one or more input devices 615, which can include without limitation a mouse, a keyboard and/or the like; and one or more output devices 620, which can include without limitation a display device, a printer and/or the like. The computer system 600 may further include (and/or be in communication with) one or more storage devices 625. The computer system 600 also can comprise software elements, shown as being located within the working memory 635, including an operating system 640 and/or other code, such as one or more application programs 645, which may comprise computer programs of the described embodiments, and/or may be designed to implement methods of the described embodiments and/or configure systems of the embodiments as described herein.

Another embodiment includes a program storage device readable by a machine (of the supplier/buyer commerce network), tangibly embodying a program of instructions executable by the machine to perform a managing a member organization experience of a collaborative commerce community through a network, when executed, comprises the steps of managing buyer company profiles of a plurality of buyer organizations and seller company profiles of a plurality of seller organizations, wherein the buyer company profiles and the seller company profiles are shared amongst buyer organizations and seller organizations associated with the network, providing unified management of collaborative interactions between the plurality of seller organizations and the plurality of buyer organizations, determining an intra-organization link between members of the member organization based on the collaborative interactions of the member organization and at least a subset of the plurality of buyer organizations or a subset the plurality of seller organizations, and electronically notifying at least one user of the member organization of the determined intra-organization link. Additionally, an embodiment further includes determining an inter-organization link between the member organization and at least one of the plurality of buyer organizations or one of the plurality of seller organizations based on the collaborative interactions between the plurality of buyer organizations and the plurality of buyer organizations, and notifying the member organization of the inter-organization link between the member organization and the at least one of the plurality of buyer organizations or the one of the plurality of buyer organizations.

Although specific embodiments have been described and illustrated, the embodiments are not to be limited to the specific forms or arrangements of parts so described and illustrated.

What is claimed is:

1. A computer-method of managing a member organization experience of a collaborative commerce community through a network, comprising:
    managing, by one or more servers, buyer company profiles of a plurality of buyer organizations and seller company profiles of a plurality of seller organizations, wherein the buyer company profiles and the seller company profiles are shared amongst the buyer organizations and the seller organizations associated with the network, wherein the member organization is at least one of the plurality of seller organizations or the plurality buyer organizations;
    maintaining the buyer company profiles and the seller company profiles, comprising:
        collecting activity information of the plurality of buyer organizations and the plurality of seller organizations, wherein collecting the activity information comprises:
        monitoring a plurality of databases that are connected to the one or more servers through the network, and that each maintain activity information associated with the plurality of buyer organizations and the plurality of seller organizations, wherein the activity information includes transacting relationships that the plurality of buyer organizations and the plurality of seller organizations have with buyers or suppliers;
        assigning a unique identification for each of the plurality of buyer organizations and the plurality of seller organizations across the plurality of databases;
        exporting the activity information associated with each buyer organization and seller organization from the plurality of databases based on the unique identification;
        aggregating the activity information exported from the plurality of databases; and
    wherein maintaining the buyer company profiles and the seller company profiles further comprises updating the buyer company profiles and the seller company profiles with the aggregated activity information;
    anonymizing the aggregated activity information, as selecting by at least one of the buyer organizations, including removing information that allows tracing of aggregated activity information back to the at least one of the buyer organizations;
    generating a single view of behavior of the at least one of the buyer organizations based on the assigned unique identifiers and the anonymized aggregated activity information;
    providing unified management of collaborative interactions between the plurality of seller organizations and the plurality of buyer organizations;
    facilitating, by a single user interface (UI), a user of the member organization accessing and navigating the collaborative interactions of the user and the member organization of the user across the plurality of servers through a single login and single URL (universal resource locator), wherein the facilitation further includes
        identifying, from at least one of the buyer company profiles and the seller company profiles, of an existing account associated with the member organization, and recommending of the existing account to the user;
    determining an intra-organization link between users of the member organization based on the collaborative interactions of the member organization and a subset of the plurality of buyer organizations or a subset of the plurality of seller organizations, based at least in part on the buyer company profiles or the seller company profiles, wherein the determining the intra-organization link between users of the member organization comprises correlating attributes of each of the users of the member organization with attributes of other users of the member organization, wherein the attributes include identified common interests and similarities in member profile information, common history, and common searches; and
    electronically notifying the user of the member organization of the determined intra-organization link.

2. The computer-method of claim 1, further comprising:
    determining an inter-organization link between the member organization and at least one of the plurality of buyer organizations or at least one of the plurality of seller organizations based on the collaborative interactions between the plurality of buyer organizations and the plurality of seller organizations;
    notifying the member organization of the inter-organization link between the member organization and the at least one of the plurality of buyer organizations or at least one of the plurality of seller organizations.

3. The computer-method of claim 2, wherein determining the inter-organization link between the member organization and the at least one of the plurality of buyer organizations or the plurality of seller organizations is based at least in part on a company profile of the member organization and the buyer company profiles of the plurality of buyer organizations, or the seller company profiles of the plurality of seller organizations.

4. The computer-method of claim 3, wherein determining the inter-organization link between the member organization and the at least one of the plurality of buyer organizations or plurality of buyer organizations is based at least in part on correlating attributes of the member company profile of the member organization with attributes of the buyer company profiles of the plurality of buyer organizations and the seller company profiles of the plurality of seller organizations.

5. The computer-method of claim 4, further comprising electronically notifying the member organization of the inter-organization links.

6. The computer-method of claim 1, wherein managing a member organization experience includes providing at least one user of each member organization with a single login, and access to collaboration with the plurality of buyer organization and the plurality of seller organizations based on the single login.

7. The computer-method of claim 1, wherein each of the buyer company profiles of each buyer organizations comprises at least self-reported information of the buyer organization.

8. The computer-method of claim 7, wherein the self-reported information includes registration information, wherein the self-reported information of the buyer organization is utilized by the collaborative interaction between the buyer organization and the plurality of seller organizations.

9. The computer-method of claim 7, wherein the buyer company profile of each buyer organization further includes community information, and third party information.

10. The computer-method of claim 9, wherein the buyer company profile of each buyer organization is adaptively updated.

11. The computer-method of claim 1, wherein each seller company profile includes self-reported information, community information, and third party information.

12. The computer-method of claim 1, wherein the collaborative interactions between the plurality of sellers and the plurality of buyers includes at least one of selling, bid, quoting, contract management, product or service fulfill, invoicing, and collections.

13. The computer-method of claim 1, wherein the collaborative interactions between the plurality of sellers and the plurality of buyers includes all of selling, bid, quoting, contract management, product or service fulfill, invoicing, and collections.

14. The computer-method of claim 1, wherein the attributes of each of the user of the member organization are included within a company and user profile of the member organization.

15. The computer-method of claim 1, further comprising identifying potential links to buyer organizations or seller organizations based on the determined intra-organization link between users of the member organization.

16. The computer-method of claim 15, further comprising notifying one or more of the users of the member organization of the identified potential links to the buyer organizations or the seller organizations.

17. The computer-method of claim 15, further comprising notifying the buyer organizations or seller organizations of the identified potential links to one or more of the users of the member organization.

18. The computer-method of claim 1, wherein the UI provides the user with a single interface access to collaborative interactions, the buyer company profiles, the seller company profiles, sharing information about workflows, and documents associated with the collaborative interactions.

19. The computer-method of claim 18, further comprising providing at least one user of the member organization with a web browser and mobile interface, allowing the at least one user to navigate to specific buyer interactions and collaborative interactions.

20. The computer-method of claim 19, wherein the UI allows the at least one user to manage a company profile of the member organization of the at least one user, set usage preferences, administer preferences and permissions, navigate business processes.

21. The computer-method of claim 19, wherein navigating business processes includes providing tabs, wherein each UI segment provides a window into collaborative interactions with each buyer organization, each seller organization, and each business process specific to that buyer/seller organization.

22. The computer-method of claim 1, wherein the attributes include tax id, or vat id.

23. The computer-method of claim 1, wherein the attributes include email domain, common addresses, common commodities, common connections, or business processes, wherein the business processes include at least one of buying or selling.

24. The computer-method of claim 1, wherein the attributes include identified common interests, email domain, common commodities, and tax id.

25. A commerce community system for managing a member organization experience of a commerce community through a network, comprising:
a commerce server electronically connected to one or more servers of a plurality of seller organizations and to one or more servers of a plurality of buyer organizations through the network, wherein the member organization is at least one of the plurality of seller organization or the plurality of buyer organizations;
the commerce server operative to:
manage buyer company profiles of the plurality of buyer organizations and seller company profiles of the plurality of seller organizations, wherein the buyer company profiles and the seller company profiles are shared amongst all buyer organizations and seller organizations associated with the network;
maintain the buyer company profiles and the seller company profiles, comprising:
collect activity information of the plurality of buyer organizations and the plurality of seller organizations, wherein collecting the activity information comprises:
monitor a plurality of databases that are connected to the one or more servers through the network, and that each maintain activity information associated with the plurality of buyer organizations and the plurality of seller organizations, wherein the activity information includes transacting relationships that the plurality of buyer organizations and the plurality of seller organizations have with buyers or suppliers;
assign a unique identification for each of the plurality of buyer organization and the plurality of seller organization across the plurality of databases;
export the activity information associated with each buyer organization and seller organization from the plurality of databases based on the unique identification;
aggregate the activity information exported from the plurality of databases; and
wherein maintaining the buyer company profiles and the seller company profiles further comprises updating the buyer company profiles and the seller company profiles with the aggregated activity information;
anonymize the aggregated activity information, as selecting by at least one of the buyer organizations, including removing information that allows tracing of aggregated activity information back to the at least one of the buyer organizations;

generate a single view of behavior of the at least one of the buyer organizations based on the assigned unique identifiers and the anonymized aggregated activity information;

provide unified management of collaborative interactions between the plurality of seller organizations and the plurality of buyer organizations;

facilitate, by a single user interface (UI), a user of the member organization accessing and navigating the collaborative interactions of the user and the member organization of the user across the plurality of servers through a single login and single URL (universal resource locator), wherein the facilitation further includes identifying, from at least one of the buyer company profiles and the seller company profiles, of an existing account associated with the member organization, and recommending of the existing account to the user;

determine an intra-organization link between users of the member organization based on the collaborative interactions of the member organization and at least a subset of the plurality of buyer organizations or at least a subset of the plurality of seller organizations, based at least in part on the buyer company profiles or the seller company profiles, wherein determining the intra-organization link between users of the member organization comprises correlating attributes of each of the users of the member organization with attributes of other users of the member organization, wherein the attributes include identified common interests and similarities in member profile information, common history, and common searches;

notify the users of the member organization of the determination of the intra-organization link;

determine an inter-organization link between the member organization and at least one of the plurality of buyer organizations or the plurality of seller organizations based on the collaborative interactions between the plurality of buyer organizations and the plurality of buyer organizations, based at least in part on the buyer company profiles or the seller company profiles; and notify the member organization of the inter-organization link between the member organization and the at least one of the plurality of buyer organizations and the plurality of seller organizations.

26. The system of claim 25, further comprising identifying potential links to buyer organizations or seller organizations based on the determined intra-organization link between users of the member organization.

27. The system of claim 25, wherein managing the member organization experience includes providing at least one user of each member organization with a single user interface (UI), wherein the UI provides the at least one user with a single interface access to collaborative interactions, the buyer company profiles, the seller company profiles, sharing information about workflows, and documents associated with the collaborative interactions.

28. A program storage device readable by a machine, tangibly embodying a program of instructions executable by the machine to perform a computer-method of managing a member organization experience of a collaborative commerce community through a network, when executed, comprises:

managing buyer company profiles of a plurality of buyer organizations and seller company profiles of a plurality of seller organizations, wherein the buyer company profiles and the seller company profiles are shared amongst buyer organizations and seller organizations associated with the network;

maintaining the buyer company profiles and the seller company profiles, comprising:

collecting activity information of the plurality of buyer organizations and the plurality of seller organizations, wherein collecting the activity information comprises:

monitoring a plurality of databases that are connected to the one or more servers through the network, and that each maintain activity information associated with the plurality of buyer organizations and the plurality of seller organizations, wherein the activity information includes transacting relationships that the plurality of buyer organizations and the plurality of seller organizations have with buyers or suppliers;

assigning a unique identification for each of the plurality of buyer organization and the plurality of seller organization across the plurality of databases;

exporting the activity information associated with each buyer organization and seller organization from the plurality of databases based on the unique identification;

aggregating the activity information exported from the plurality of databases; and wherein maintaining the buyer company profiles and the seller company profiles further comprises updating the buyer company profiles and the seller company profiles with the aggregated activity information;

anonymizing the aggregated activity information, as selecting by at least one of the buyer organizations, including removing information that allows tracing of aggregated activity information back to the at least one of the buyer organizations;

generating a single view of behavior of the at least one of the buyer organizations based on the assigned unique identifiers and the anonymized aggregated activity information;

providing unified management of collaborative interactions between the plurality of seller organizations and the plurality of buyer organizations;

facilitate, by a single user interface (UI), a user of the member organization accessing and navigating the collaborative interactions of the user and the member organization of the user across the plurality of servers through a single login and single URL (universal resource locator), wherein the facilitation further includes identifying, from at least one of the buyer company profiles and the seller company profiles, of an existing account associated with the member organization, and recommending of the existing account to the user;

determining an intra-organization link between members of the member organization based on the collaborative interactions of the member organization and at least a subset of the plurality of buyer organizations or a subset of the plurality of seller organizations, wherein the determining the intra-organization link between users of the member organization comprises correlating attributes of each of the users of the member organization with attributes of other users of the member organization, wherein the attributes include identified common interests and similarities in member profile information, common history, and common searches;

electronically notifying at least one user of the member organization of the determined intra-organization link;

determining an inter-organization link between the member organization and at least one of the plurality of buyer organizations or at least one of the plurality of seller organizations based on the collaborative interactions between the plurality of buyer organizations and the plurality of seller organizations, based at least in part on the buyer company profiles or the seller company profiles; and notifying the member organization of the inter-organization link between the member organization and the at least one of the plurality of buyer organizations or at least one of the plurality of seller organizations.

29. A computer-method of managing a member organization experience of a collaborative commerce community through a network, comprising:

managing, by one or more servers, buyer company profiles of a plurality of buyer organizations and seller company profiles of a plurality of seller organizations, wherein the buyer company profiles and the seller company profiles are shared amongst buyer organizations and seller organizations associated with the network, wherein the member organization is at least one of the plurality of seller organizations or the plurality buyer organizations;

maintaining the buyer company profiles and the seller company profiles, comprising:

collecting activity information of the plurality of buyer organizations and the plurality of seller organizations, wherein collecting the activity information comprises:

monitoring a plurality of databases that are connected to the one or more servers through the network, and that each maintain activity information associated with the plurality of buyer organizations and the plurality of seller organizations, wherein the activity information includes transacting relationships that the plurality of buyer organizations and the plurality of seller organizations have with buyers or suppliers;

assigning a unique identification for each of the plurality of buyer organization and the plurality of seller organization across the plurality of databases;

exporting the activity information associated with each buyer organization and seller organization from the plurality of databases based on the unique identification;

aggregating the activity information exported from the plurality of databases; and wherein maintaining the buyer company profiles and the seller company profiles further comprises updating the buyer company profiles and the seller company profiles with the aggregated activity information;

anonymizing the aggregated activity information, as selecting by at least one of the buyer organizations, including removing information that allows tracing of aggregated activity information back to the at least one of the buyer organizations;

generating a single view of behavior of the at least one of the buyer organizations based on the assigned unique identifiers and the anonymized aggregated activity information;

providing unified management of collaborative interactions between the plurality of seller organizations and the plurality of buyer organizations;

facilitating, by a single user interface (UI), a user of the member organization accessing and navigating the collaborative interactions of the user and the member organization of the user across the plurality of servers through a single login and single URL (universal resource locator), wherein the facilitation further includes identifying, from at least one of the buyer company profiles and the seller company profiles, of an existing account associated with the member organization, and recommending of the existing account to the user;

determining an intra-organization link between users of the member organization based on a profile of the member organization or the buyer company profiles of the plurality of buyer organizations, or the seller company profiles of the plurality of seller organizations, based at least in part on the buyer company profiles or the seller company profiles, wherein the determining the intra-organization link between users of the member organization comprises correlating attributes of each of the users of the member organization with attributes of other users of the member organization, wherein the attributes include identified common interests and similarities in member profile information, common history, and common searches; and electronically notifying at least one user of the member organization of the determined intra-organization link.

\* \* \* \* \*